May 14, 1940.  B. R. BENJAMIN ET AL  2,200,768
POWER LIFT
Filed Nov. 10, 1938    3 Sheets-Sheet 1

Inventors
Bert R. Benjamin & Carl W. Mott

Inventors
Bert R. Benjamin
Carl W. Mott.
By [signature]
Atty.

May 14, 1940.  B. R. BENJAMIN ET AL  2,200,768
POWER LIFT
Filed Nov. 10, 1938  3 Sheets-Sheet 3

Inventors
Bert R. Benjamin & Carl W. Mott
By V. F. Lavague
Atty.

Patented May 14, 1940

2,200,768

UNITED STATES PATENT OFFICE 2,200,768

POWER LIFT

Bert R. Benjamin, Oak Park, and Carl W. Mott, La Grange, Ill., assignors to International Harvester Company, a corporation of New Jersey Application November 10, 1938, Serial No. 239,776

14 Claims. (Cl. 97—50)

This invention relates to a power operable means for moving implements directly connected to tractors.

The object of the invention is to provide a power operable arrangement which will successively move implements mounted for movement on the front and rear portions of the tractor.

According to this invention, there is provided a power operable means to which the implements are so connected that an implement on the forward portion of the tractor is moved prior to the moving of the implement on the rear portion of the tractor. By merely initiating the operation of the power operable means, this successive movement of the implements is automatically effected. The power operable means takes the form of a ratchet mechanism adapted to operate through a half revolution at a time. When the half revolution is completed, there is means for automatically stopping the operation of the power operable means. Connected to this power means is a cam which has thereon active and delaying portions. The implements in their connection with this cam means are so arranged that the implement on the forward portion of the tractor will receive movement from the active portion, while the implement on the rearward portion of the tractor will remain on the delaying portion of the cam. Upon one-half revolution of the cam, the implements are moved to the ground position, and on the other half revolution of the cam, the implements will be moved from the ground engaging position.

For a better understanding of the invention, reference may be had to the following detailed description taken in connection with the accompanying drawings, in which:

Figure 4 is a detail showing of a safety means forming part of the power operable means;

Figure 1:
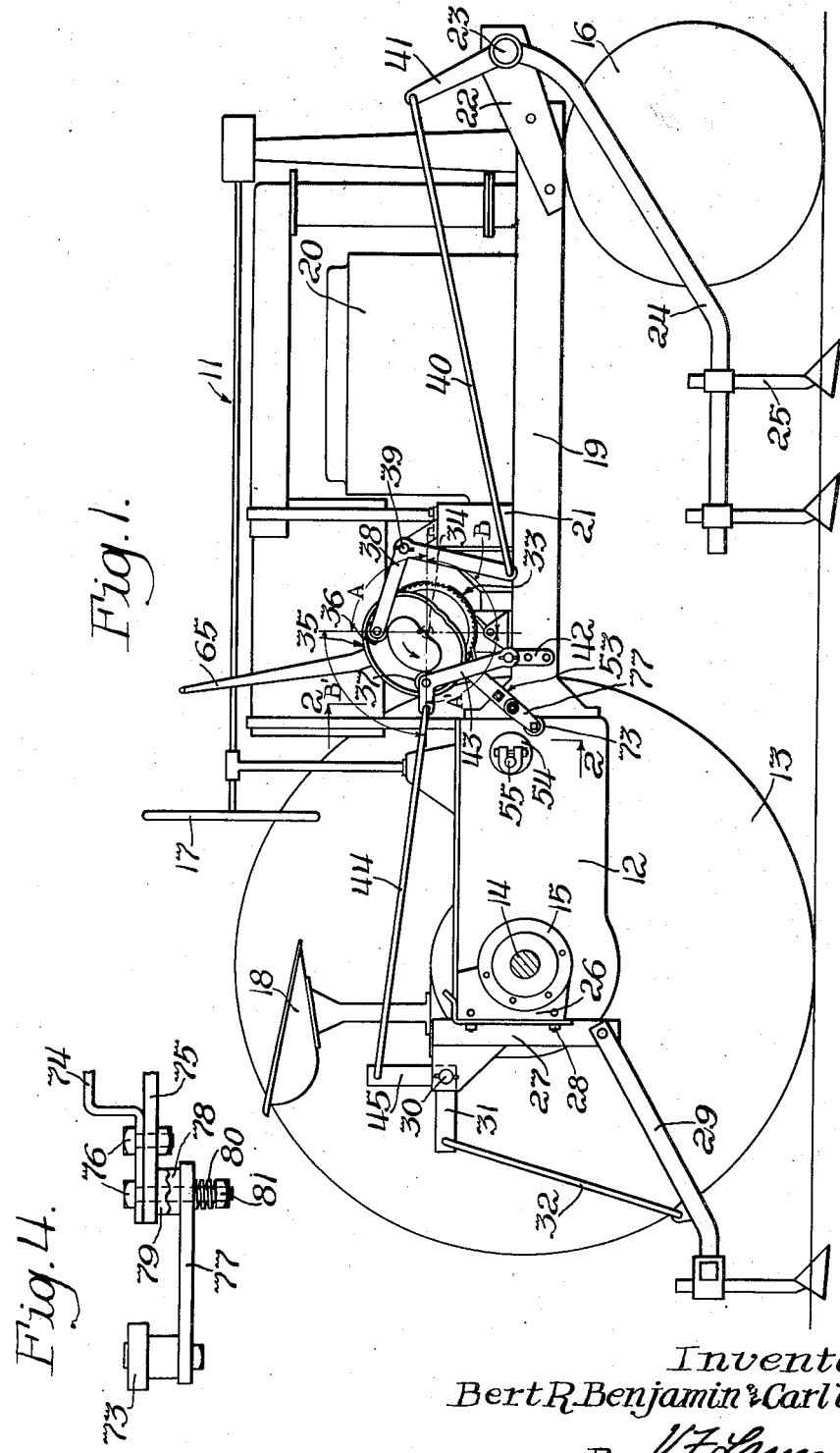
Figure 1 is a view in elevation of a tractor having implements mounted on its forward and rear portions and showing their connection to the power operable means.

In the figures, there is shown a tractor or motor propelled vehicle 11 comprising, in general, a transmission and differential housing 12 from which is driven rear wheels 13 of the tractor through an axle 14 located within a laterally extending axle housing 15. The tractor also has forward steerable wheels 16 for supporting the forward portion of the tractor and adapted to be steered by a steering wheel 17 located near an operator's station 18. Extending longitudinally forwardly of the transmission housing 12 are side sills 19 on which are mounted the motor 20, fly-wheel housing 21 and other accessories.

On the forward portion of the tractor and connected to the side sills 19 are forwardly extending portions 22 on which are journaled a transverse rock-shaft 23 extending across the front of the tractor. Connected to this rock-shaft and adapted to be moved thereby is an implement beam 24 having cultivator tools 25 thereon. While only one such beam is shown connected to the rock-shaft, it should be understood that other such beams could be connected to this rock-shaft at the other side of the tractor.

On the rear axle housings 15, there is connected vertically extending attaching plates 26 to which can be attached a supporting frame 27 by means of swing bolts 28 in their usual manner. This supporting frame 27 has an implement frame 29 pivoted thereto and a transverse rock-shaft 30 connected through a lifting arm 31 and a lifting link 32 to the implement frame 29.

Mounted on the side sills 19 is a power operable means, designated generally at 33, which will be described more in detail hereinafter. This power operable means has a power out-put shaft 34 to which is rigidly connected a single actuating cam or device 35. The power operable means is of the type adapted to rotate a half revolution at a time, and this same movement is given to the cam 35.

The cam 35 takes the form of a plate having a groove therein in which cam followers 36 and 37 are made to travel. The follower 36 is carried on the end of a bell crank lever 38 fulcrumed on a bracket 39 carried by the fly-wheel housing 21. The other end of the bell crank lever 38 is connected through a link 40 to an arm 41 on the transverse rock-shaft 23. It should thus be seen that movement imparted to the cam follower 36 will effect movement of the rock-shaft 23 and of the front implement 24 connected thereto.

Mounted on the side sill 19 is another bracket 42 on which is pivoted a lever 43 that carries the cam follower 37 and to which is connected a connecting link 44, the other end of which connects with an arm 45 on the rock-shaft 30.

Figure 2:
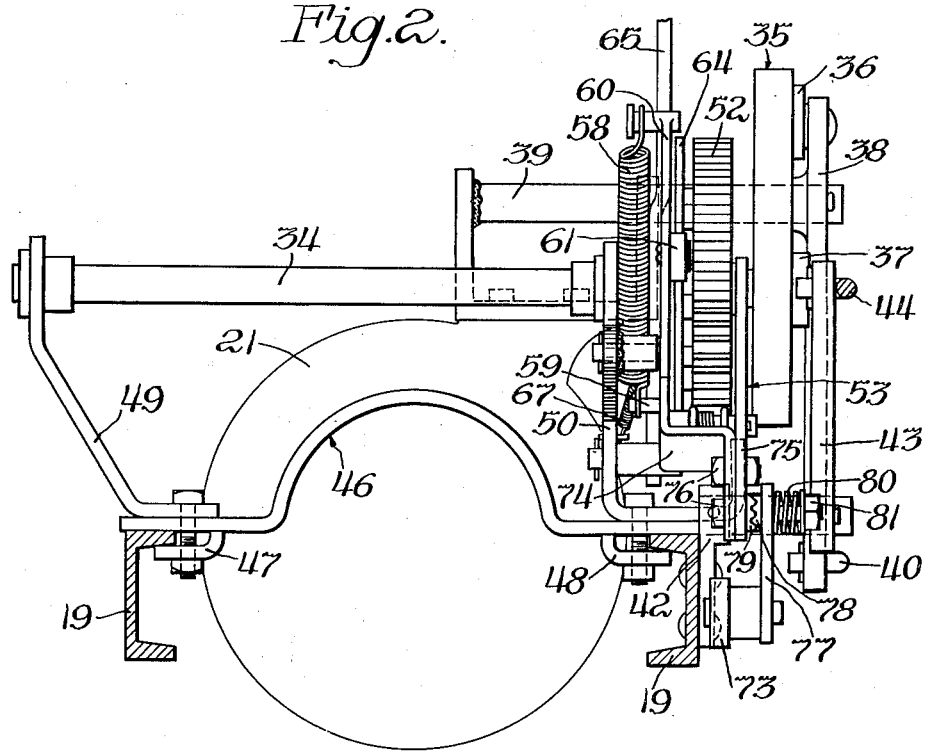
Figure 2 is an enlarged view taken along the lines 2—2 of Figure 1, showing the power operable means and the cam means for connecting the implements to the same.
Figure 3:
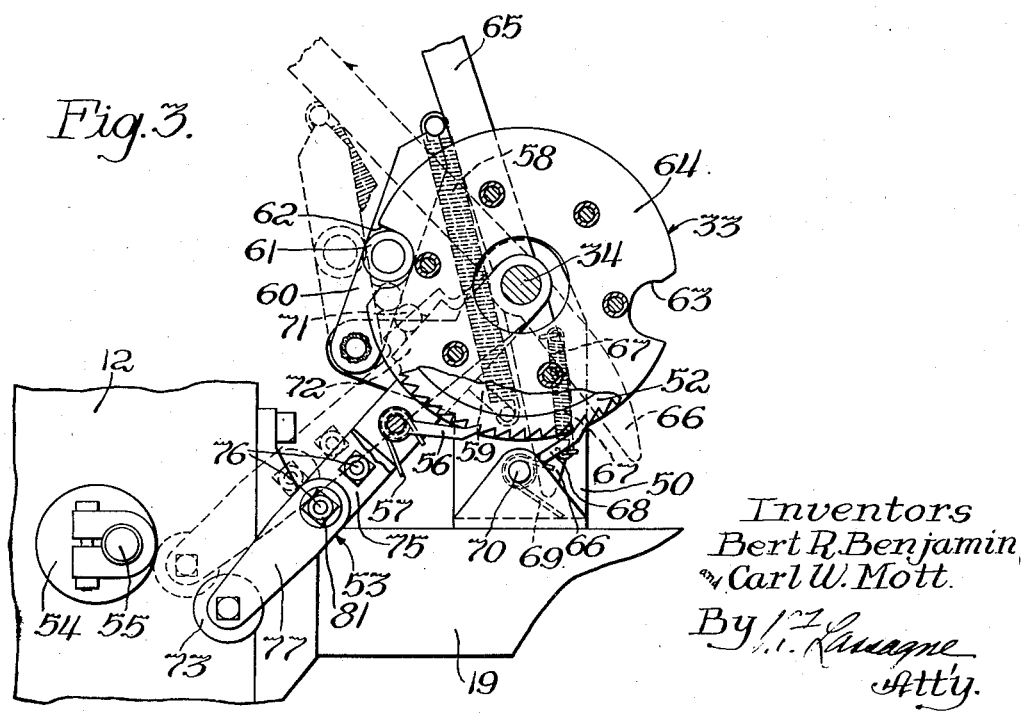
Figure 3 is another view showing more in detail the power operable means.

The power operable means 33 is of the ratchet type described and claimed in copending application to Carl W. Mott, Serial No. 144,672, filed May 25, 1937. Referring now to Figures 2 and 3, there is shown a vertically extending bracket 46 supported on the side sills 19 and clamped thereto by clamping means 47 and 48. This bracket includes an upwardly extending portion 49 at the left side of the tractor and a similar portion 50 on the right side of the tractor. In the upper ends of these vertically extending portions, there is journaled a power out-put shaft 34. Rigidly connected to the shaft 34 is a ratchet wheel 52 adapted to be stepped in rotation by a swingable arm means 53 pivoted on the out-put shaft 34 and adapted to be moved in a forward direction by an eccentric cam 54 receiving power from a shaft 55 driven by the motor 20 through transmission means within the housing 12. This swingable arm 53 has thereon a ratchet pawl 56 adapted to be kept normally in engagement with the ratchet teeth on the ratchet wheel by means of a spring 57. As the swingable arm 53 moves forwardly, the ratchet pawl 56 being engaged with the ratchet wheel will cause a counter-clockwise movement of the ratchet wheel and of the out-put shaft 34. When the arm 53 has moved forwardly to the maximum extent of the cam surface 54, it is returned and made to follow the cam by a spring 58 connected to a projection 59 on the swingable arm means and at its other end to the upper end of a pivoted lever 60, which is pivoted on the vertically extending portion 50 of the bracket 46. This lever 60 has thereon midway between its ends a roller 61 which is adapted normally to fit in slots 62 and 63, 180 degrees apart in a disk 64 rigidly connected to the ratchet wheel 52.

Pivoted on the out-put shaft 34 is an operating lever 65 having a downwardly depending portion 66 to which is connected a spring 67, the other end of which is anchored to the vertical bracket portion 50. The bracket portion 50 has thereon a holding pawl 68 adapted to be held against the ratchet wheel 52 by means of a spring 69. This holding pawl is pivoted on a transversely extending pin 70 on the bracket portion 50. The end 66 of the operating lever will normally be held against the pin 70 by the spring 67.

On the pivoted lever 60 is a forwardly extending projection 71 adapted to engage with a portion 72 on the swingable arm 53. Normally, when the power means is not in operation, the projection 71, when the roller 61 is fitted in either of the slots 62 or 63 of the disk 64 and maintained by the spring 58, engages the portion 72 of the swingable lever whereby the swingable lever is kept out of contact with the eccentric cam 54.

To effect operation of the power means, the lever 65 is pulled by the operator to engage the upper end of the pivoted lever 60 and to remove the roller 61 thereof from one of the slots in the disk 64, taking the position shown by the dotted lines in Figure 3. The moving rearwardly of the lever 60 pulls with it the swingable arm 53 through the spring 58 whereby the swingable arm is maintained in contact with the cam 54. The arm 53 preferably has a roller 73 for contacting the cam 54. The arm 53 preferably has a roller 73 for contacting the cam 54. The operator holds the roller 61 out of engagement only a sufficient time for the disk 64 to move by so that the roller can be returned to engage the unrecessed portion of the disk. Movement of the swingable arm 53 will continue to and fro until the disk 64 has rotated through a half revolution so that the roller 61 will seat in the slot 63 thereof. Upon the roller seating in the slot, the swingable arm 53 will be automatically pushed out of contact with the eccentric cam 54 by the projection 71 of the lever 60, thereby automatically stopping the operation of the power means. Since the disk 64 is rigid with respect to the out-put shaft 34, the out-put shaft 34 and the cam 35 will have travelled a half revolution, or 180 degrees.

Figure 5:
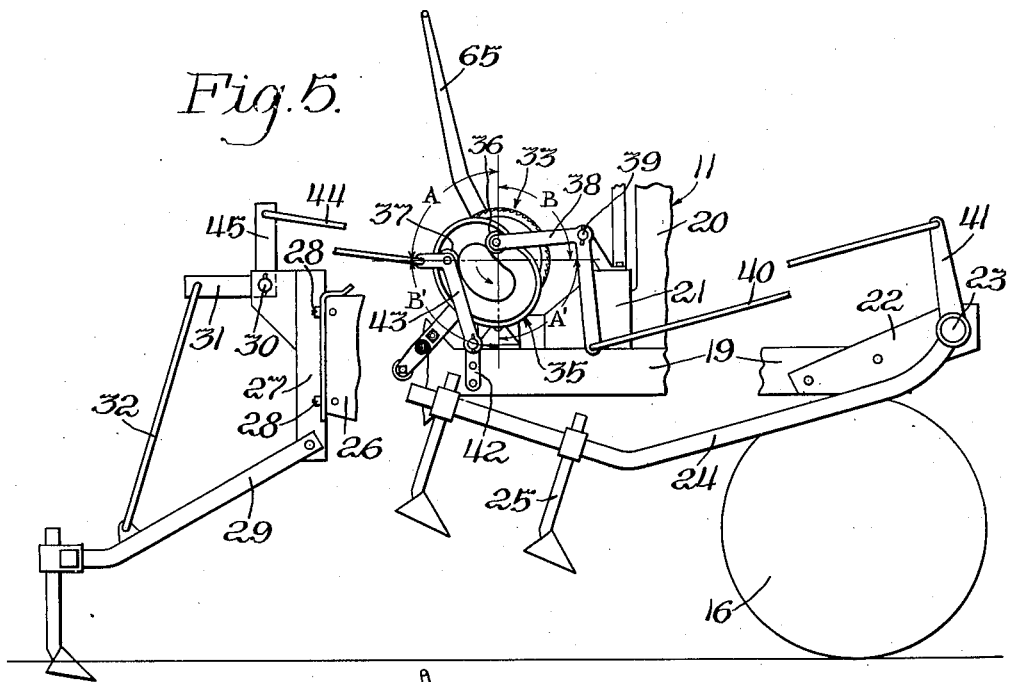
Figure 5 is a diagrammatic view showing the position of the cam means after it has passed through 90 degrees to lift the forward implement only; and, Figure 6 is a view similar to Figure 5, illustrating the cam plate after it has completed its half revolution through the second 90 degrees to lift the implement on the rear portion of the tractor.
Figure 6:
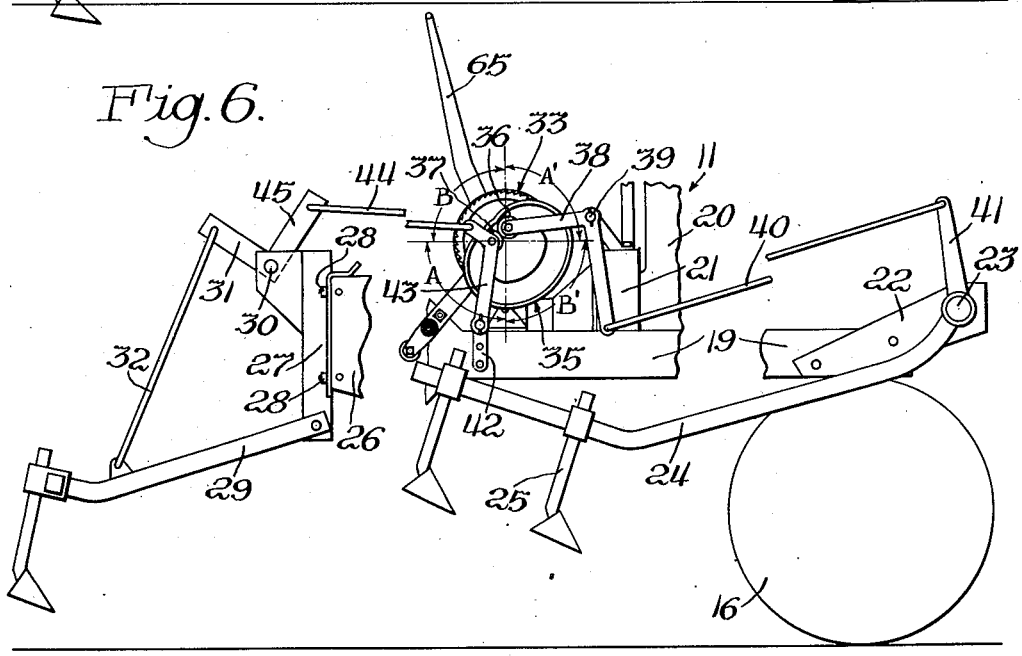

Referring to Figures 1, 5 and 6, the cam 35 has two active portions A and A' and two delaying portions B and B'. The cam followers 36 and 37 are so arranged, when located in the groove of the cam, that they are 90 degrees apart. The cam means is rotated in a counterclockwise direction and as the active portion A passes through 90 degrees, the follower 36 will be moved downwardly and operation of the implement on the forward portion of the tractor will be effected. The follower 37, however, during this first quarter of a revolution passes over the delaying portion B'. On the next quarter revolution, the follower 36 will pass over the delaying portion B while the follower 37 will pass over the active portion A. Thus, there is effected on the second quarter or revolution of the cam 35 a lifting of the rear implement 29. An illustration of this cycle is best shown by Figures 5 and 6. The cam means will have only made a half revolution and both of the implements on the front and rear portions of the tractor will have been raised.

To effect moving of the implements to their ground engaging positions, another half revolution of the cam 35 in the cam counter-clockwise direction is effected by the power operable means, the manual operating lever 65 associated with the pivoted lever 61 being means for initiating operation of the power operable means.

On the next half revolution, starting with the cam 35 in the position shown in Figure 6 with both of the implements in their raised position, the follower 36 will pass over the active portion A' on the first quarter of the revolution to permit lowering of the implement frame while the cam follower 37 dwells over the delaying portion B. On the next quarter of revolution, the cam follower 37 passes over the active portion A' while the cam follower 36 dwells over the delaying portion B'.

The projection to which the spring 58 is connected and the projection 72 with which the projection 71 of the lever 60 engages is preferably on an off-set portion 74 of the swingable arm 53, see Figure 2. The portion 74 is clamped to a main portion 75 by means of clamping bolts 76. In order to effect a safety arrangement for the power operable means, when, because of the tendency of the implements to remain in the ground, against the will of the power means, there is connected to one of these bolts a separate portion 77 having a clutch face 78 adapted to engage with a clutch face 79 and maintained only thereagainst by the lateral force of a spring 80 retained on one of the bolts 76 by a nut 81, see Figures 2 and 4. This separate portion 77 carries the cam roller 73 and will normally be rigid with the portions 74 and 75 of the swingable arm means 53, except when undue strain is place on the power means. When the clutch faces 78 and 79 disengage due to stress, the swingable arm means 53 will be inactive to effect ratcheting of the ratchet wheel 52.

It should now be seen that by the present arrangement, there has been effected a means for connecting the front and rear implements of a tractor to the power operable means so as to obtain automatic successive movement of the front and rear implements, respectively, by merely putting the power means into operation. Upon starting the power operable means to initiate ratcheting, the front implement frame 24 will be raised first out of the ground at the end of a row which is being cultivated and after this implement has been raised and the tractor has been moved forwardly so that the rear implement 29 has reached the end of the field, the rear implement 29 will then be lifted. It should also be understood that the implements also move to their ground engaging positions in the same sequence resulting from automatic delaying of the movement of the rear implement.

While various modifications may be made in the construction of the arrangement for accomplishing this desired effect, it shall be understood that such modifications shall come within the spirit and scope of the present invention as defined by the appended claims.

What is claimed is:

1. The combination with a motor propelled vehicle, of an implement mounted for movement on the front of the vehicle, another implement mounted for movement on the rear of the vehicle, means operable by the motor for moving the implements, and means for so connecting the implements to said moving means including a single actuated device common to both implements as to provide successive movement of the front and rear implements respectively upon operation of said moving means.

2. In combination, a tractor having forward and rearward portions, an implement mounted for movement on the forward portion, another implement mounted for movement on the rearward portion, power operable means associated with the tractor, and means for so connecting the implements to the power means including a single actuated device common to both implements as to effect successive movement of the implements on the forward and rearward portions respectively upon the power means being operated.

3. In combination, a tractor having a power operable means, an implement mounted for vertical movement on the front of the tractor, another implement mounted for vertical movement on the rear of the tractor, and means for so connecting the implements to the power operable means including a single actuating device common to both implements as to provide successive lifting of the front and rear implements respectively upon operation of the power means.

4. In combination, a vehicle having forward and rearward portions, implements mounted for movement on these portions, power operable means associated with the vehicle, and means for so connecting the implement to the power means including a single actuating device common to both implements as to automatically effect successive movement of implements on the forward and rearward portions respectively upon the power means being operated.

5. In combination, a tractor having forward and rearward portions, an implement mounted for movement on the forward portion, another implement mounted for movement on the rearward portion, a rock-shaft journaled on the tractor and connected to the implement on the forward portion thereof, a second rock-shaft journaled on the tractor and connected to the implement on the forward portion thereof, power operable means carried by the tractor, and means for so connecting the rock-shafts to the power means including a single actuating device common to both implements as to automatically effect successive rocking of the first and second mentioned rock-shafts respectively, whereby movement of the implement on the forward portion is made prior to movement of the implement on the rearward portion.

6. In combination, a tractor having forward and rearward portions, an implement mounted for movement on the forward portion, another implement mounted for movement on the rearward portion, a rock-shaft journaled on the tractor and connected to the implement on the forward portion thereof, a second rock-shaft journaled on the tractor and connected to the implement on the rearward portion thereof, power operable means on the tractor including a power out-put shaft, cam means adapted to be operated by the out-put shaft and having active and delaying portions thereon, and said rock-shafts connected to the cam means for operation by the same, such that the rock-shaft for the forward portion receives movement from the active portion of the cam means while the rock-shaft for the rearward portion is associated with the delaying portions thereof.

7. In combination, a tractor having forward and rearward portions, an implement mounted for movement on the forward portion, another implement mounted for movement on the rearward portion, power operable means on the tractor, cam means adapted to be operated by the power means and having active and delaying portions thereon, and means for connecting the implements with the cam means such that the implement for the forward portion receives movement from the active portion of the cam means while the implement on the rearward portion is associated with the delaying portion thereof.

8. In combination, a tractor having forward and rearward portions, implements mounted on the forward and rearward portions respectively to be moved to and from its ground engaging position, power operable means on the tractor, cam means adapted to be operated by the out-put means having active and delaying portions thereon, means for connecting the implements for operation by the cam means, the connecting means for the implement on the forward portion coming in contact with the active portion on the cam prior to the connecting means for the implement on the rearward portion coming in contact with the active portion upon operation of the power means to move the implement to its ground engaging position and to move the implement from its ground engaging position.

9. In combination, a tractor having forward and rearward portions, implements mounted on the forward and rearward portions respectively to be moved to and from its ground engaging position, power operable means on the tractor, cam means adapted to be operated by the out-put means having active and delaying portions thereon, means for connecting the implements for operation by the cam means, the connecting means for the implement on the forward portion coming in contact with the active portion on the cam prior to the connecting means for the implement on the rearward portion coming in contact with the active portion upon operation of the power means to move the implement to its ground engaging position and to move the implement from its ground engaging position, and means for automatically rendering the power out-put means ineffective when both of the implements have been moved to their ground engaging positions and when both of the implements have been moved from their ground engaging position.

10. In combination, a vehicle, implements mounted for movement on the vehicle, power operable means, a single cam means adapted to be operated by the power out-put means and having active and delaying portions thereon, means for connecting each of the implements to the cam means such that one of the implements will be affected by an active portion of the cam before the other implement will be affected, whereby said implements are successively moved.

11. In combination, a vehicle, implements mounted for movement on the vehicle, power operable means of the half revolution type carried by the frame, cam means adapted to be operated by the power means and having two active portions and two delaying portions, one active portion and one delaying portion being made to travel for each half revolution of the power means, and means for connecting the implements to the cam means so that one is acted upon by an active portion before the other is so acted upon and while the other remains inactive over the delaying portion, whereby the implements are successively moved.

12. In combination, implements mounted for movement on the vehicle, power operated ratchet means including means for initiating its operation and automatic means for stopping the same after it has operated through one-half revolution, cam means connected to the ratchet means to be operated thereby and having two active portions and two delaying portions, one active portion and one delaying portion being made to travel for each half revolution of the power means, two cam followers adapted to follow the cam means, one adapted to be acted upon by the active portions while the other remains inactive over the delaying portions, and means for connecting the implements to cam followers to be moved thereby.

13. In combination, a tractor having forward and rearward portions, implements mounted for vertical movement on the respective portions, power operable means of the half revolution type on the tractor, cam means connected to the power means and having two active and two delaying portions alternately arranged, two cam followers arranged such that when one is acted upon by the active portion the other will dwell over a delaying portion, and means for connecting the implements respectively to the cam followers, whereby successive movement of the implements is effected.

14. In combination, a tractor having transmission gearing, an implement mounted on the tractor for movement to and from the ground engaging position, an eccentric cam adapted to be driven by the transmission gearing, a ratchet power means including a swingable arm adapted to engage with an eccentric cam, means for connecting the implements with the power means, and said swingable arm having a safety means associated therewith to release when the implement resists the power means.

BERT R. BENJAMIN.
CARL W. MOTT.